United States Patent [19]

Ahlquist, Jr. et al.

[11] Patent Number: 5,353,396
[45] Date of Patent: Oct. 4, 1994

[54] SYSTEM AND METHOD FOR GENERATING COMPLEX CALLIGRAPHIC CURVES

[75] Inventors: John B. Ahlquist, Jr., Garland; James R. Von Ehre, II; Samantha Seals-Mason, both of Plano, all of Tex.

[73] Assignee: Altsys Corporation, Richardson, Tex.

[21] Appl. No.: 894,272

[22] Filed: Jun. 4, 1992

[51] Int. Cl.⁵ .............................................. G06F 15/40
[52] U.S. Cl. .................................................. 395/142
[58] Field of Search ............... 395/150, 151, 141, 142, 395/143; 340/732, 734, 735, 750, 747; 345/180, 181

[56] References Cited

U.S. PATENT DOCUMENTS

| | | | |
|---|---|---|---|
| 4,590,585 | 5/1986 | Cummings et al. | 364/900 |
| 4,620,287 | 10/1986 | Yam | 364/518 |
| 4,682,189 | 7/1987 | Purdy et al. | 364/523 |
| 5,214,754 | 5/1993 | Okamoto et al. | 395/142 |

OTHER PUBLICATIONS

Fontographer Software Package Version 3.5 Documentation Copyright 1992 Altsys Corporation.
Adus ® FreeHand ™ 1.0, Jan. 1988 (Documentation).

*Primary Examiner*—Phu K. Nguyen
*Attorney, Agent, or Firm*—Winstead Sechrest & Minick

[57] ABSTRACT

A system and method for generating complex calligraphic curves from an input source. The input can be a stylus and the angle of attack of the line with respect to a surface can be fixed or variable. The calligraphic curve can have a fixed or variable width which can be point-by-point edited to form a new calligraphic curve. The system has the ability to expand a calligraphic image with crossing strokes.

49 Claims, 13 Drawing Sheets

SYSTEM AND METHOD FOR GENERATING COMPLEX CALLIGRAPHIC CURVES

TECHNICAL FIELD OF THE INVENTION

This invention relates to graphic presentations and more particularly to a system and method for generating complex calligraphic curves.

BACKGROUND OF THE INVENTION

Calligraphy is an ancient drawing form and derives its name from beautiful or elegant penmanship. On paper a calligraphic stroke is created by a type of pen called a calligraphic pen which has a long narrow nib which allows ink to flow onto the writing surface. There is a basic "grammar" of movements of the calligraphic pen, called strokes, which in proper combinations produces recognizable letter forms or flourishes. The stroke needed to create a calligraphic letter is called its "ductus," from Latin "to draw." A single stroke is created by using one or all of the following traditional techniques: (1) changing the angle of the chiseled nib; (2) changing the pressure of the nib, thus allowing more ink to flow or widening the nib to allow more ink to cover more surface of the paper; and (3) changing the direction of the nib from right to left and up and down. It is the calligrapher's skill in working the interaction of the physical characteristics of the pen with its stroking techniques that ultimately produces calligraphy.

In modern computer systems, a problem results when a user wishes to generate on a computer screen (or on a printer) a curve representative of a calligraphic stroke. One could simulate static calligraphic paths by any manner of methods on the screen. However, to model the direct stroking is quite another task.

Soon after the advent of high-resolution screens and graphical user interfaces, one could find bitmap based "painting" programs containing "brushes" for calligraphy. These "brushes" allowed only a static or unchanging angle. However, one could choose from a pallet of "brush" angles, but the system did not allow for the measuring of pressure for changing the width of the nib. A problem would arise when la mistake was made or one wanted to alter a path. To make corrections meant removing and/or adding pixels to the bitmap image, not a quick process or an easy one. The "brush" movements were accomplished by using a new device called a mouse, producing not very smooth or true freestyle strokes. One could use a graphics "tablet" to aid in producing freestyle strokes, however, nothing else was available for this task.

Thereafter, vector-based "drawing" programs arrived. With these programs a calligraphic path could be hand-built by carefully adding enough points to a path to make it look smooth. This was a tedious and slow process for something which should be simple and direct. Unless one understood the mathematics behind a calligraphic path, one could not accurately model the path's change in angle, pressure or direction. These programs had no pallet "brushes" either. The one key benefit was that a user could make corrections easily and rapidly. Using a graphics tablet provided only speed improvements and more accurate point placement, particularly for tracing.

Finally, the vector-based "drawing" programs moved to using Bezier curves. This new method of creating paths provided speed, ease of use and more accurate modeling of calligraphic strokes. A user could simulate change in angle, pressure and direction. However, one still did not have direct stroking of the path as a whole, only its "control" points used to define the path. Again, using a graphics tablet provided only speed improvements and more accurate point placement. Ideally, a user would want the ease of stroking that a bitmap program provides with the ease of editing a vector-program offers.

One characteristic of a calligraphic pen stroke is that the nib is carried at a specific angle, thus the beginning of a line stroke and the end of that line stroke should have the same angle with respect to the paper or screen.

In the prior art this is not the case. In such prior art systems the angle of the stroke at the end of the stroke does not match the angle of the stroke at the start point. While the precise reasons for these mismatches are known only to the system programmer, they certainly leave a very fundamentally inaccurate and unsatisfying image on the screen or on an electronically printed reproduction.

Accordingly, there is a need in the art for a system and method of creating calligraphic strokes from an off-screen input source, when the source provides data points pertaining to length, direction, angle of attack and line width.

A problem results when a calligraphic stroke crosses over the angle of the stroke. This problem is best understood by visualizing a "5" in calligraphic stroke. On the top part of the "5" where a corner is produced, the angle of the pen is held constant so that the expansion of the intersecting strokes produces an open corner that does not accurately mimic a hand drawn calligraphic "5." Additionally, upon the curved section of the "5," the stroke actually crosses back across itself in at least one instance resulting in the curve of the stroke becoming quite narrow. This narrowness yields a major problem when a user tries to edit the curve since the lines are crossed, and the resulting figure becomes distorted because the discontinuities in the curve inhibit the user's ability to expand and fill in the image.

Further problems result when editing is desired to change the width or stroke of the character. The fact that strokes have crossed over themselves creates a difficult task for editing.

Another very serious problem is that often it is desired to perform geometric operations on the calligraphic images, and when they cross over themselves or intersect it is very difficult to perform any of these geometric operations.

SUMMARY OF THE INVENTION

These and other problems have been solved by a system and method which allows for the creation of the outline of a calligraphic movement and which also provides for a same start and stop angle with respect to the image. The system takes as an input a bezier curve and calculates the calligraphic outline of the curve based on the input curve and accounts for the changing of the width of the pen based on the angle by calculating where the angle of the curve matches the angle of the pen and at those locations it handles problems that would be caused by the curve crossing over itself.

As discussed, problems result from the straightforward solution to expanding the calligraphic line image when a curve starts at an angle and curves to another angle and that angle crosses the angle of the pen. As a result, the two curves that form the sides of the calligraphic stroke will cross each other at some point in the middle. Our system and method solves the problem by determining the location in the curve where it crosses the angle of the pen. At that point an edge from one side of the line outline crosses over and now follows the other side of the line outline until it crosses back. The system keeps track of which end of the pen is at the top side of the curve. At the point that the curves cross over, the bottom side of the pen becomes the top and the pen side that was originally the top becomes the bottom of the curve.

In operation, as the calligraphic stroke is being generated by the user, the image is initially created as an approximation of the line so that the user may see the image being formed in real time. However, in actuality the system creates the center line, or spine, of the resultant image. The system is designed to look ahead to see where the curve is moving to determine where the outline should be. When the user is finished creating the curved shape, the system operates to construct the outline of the calligraphic image from the created center line. The system then displays on a screen the outline of the calligraphic image having points along the outline periphery which then can be manipulated by the user for the purpose of editing and performing geometric functions with respect to the created line.

One technical advantage of our system is that a user can move a stylus across a pad and along with various other input sources can create calligraphy for letter forms or other drawings.

Another technical advantage of our system is the creation of a graphics system which, depending upon line width and angle information, creates an outline of the desired calligraphic image on a screen, such that the image contains points editable for controlling subsequent outlines of images.

A still further technical advantage is that our system allows a user to create calligraphic strokes from an off-screen input source, when the source provides data points pertaining to length, direction, angle of attack and line width.

A still further technical advantage of our system is to construct the outline of a calligraphic image from a created center line. The system then displays on a screen the outline of the calligraphic image having points along the outline periphery which then can be manipulated by the user for the purpose of editing and performing geometric functions with respect to the created line.

A still further technical advantage of the present invention is the font generating capabilities consisting of calligraphic curve characteristics.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
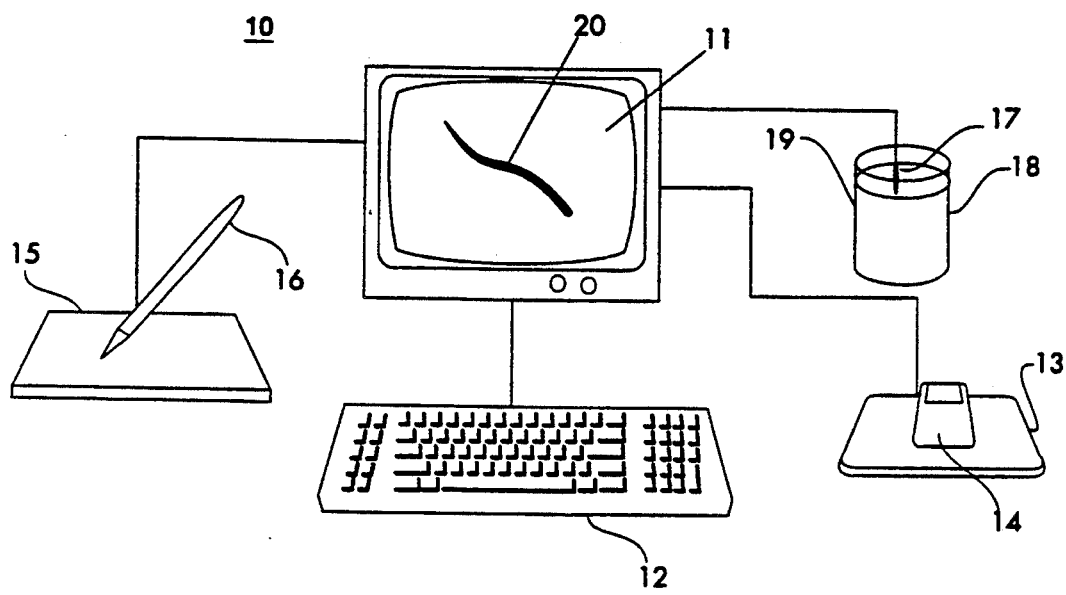
FIG. 1 shows an overall system utilizing our system and method for generating calligraphic curves.

Turning now to FIG. 1, there is shown a representative system 10 for implementing the principles of the present invention which has in it, in one example, a computer graphics display 11 and keypad 12. Also connected to computer graphics display 11 is mouse 14 with its associated pad 13 and also connected to the computer graphics display 11 is pressure sensitive tablet 15 and its associated pen 16 and also connected to the computer graphics display 11 is a reservoir 18 containing a fluid 19 with its associated stylus 17. Displayed on the screen is a calligraphic image 20 created in any number of different ways, either from the keypad 12 or from a mouse 14 or from a stylus 16 moving across a tablet 15. In addition, there are many other methods in which such an image can be created using the principles of our invention.

Before beginning, the reader is referred to copending U.S. patent application, Ser. No. 07/833,977, entitled "A System and Method for Generating Real Time Calligraphic Images," hereby incorporated by reference herein, to understand how calligraphic images are constructed.

For an understanding of the creation of variable width lines, the reader is referred to copending patent application, Ser. No. 07/833,957, entitled "A System and Method of Generating Variable Width Lines," hereby incorporated by reference herein.

To produce the calligraphic outlines described in the present invention, the reader may purchase the "FONTOGRAPHER" software package available from Altsys Corporation, 269 W. Renner Road, Richardson, Tex. 75080, hereby incorporated by reference herein. The calligraphic outlines may be utilized in creating fonts for printing.

Additional information required for the calligraphic expansion is the angle of the calligraphic pen which could be specified in a dialog box on the screen. Once established in the system, this angle may remain constant as the user moves the pen across the pressure sensitive tablet or as the user inputs information from the keypad and mouse. As will be seen the user can specify a constant width for the line or can specify that the line will be dependent upon the amount of pressure applied to the pen or upon keys inputted from the keyboard.

Figure 2:
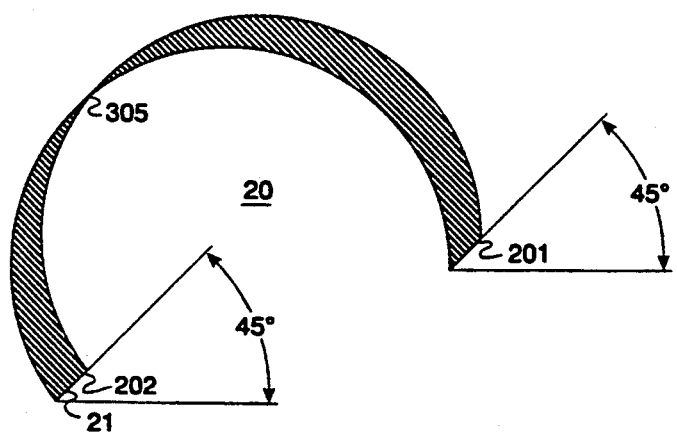
FIG. 2 is the screen as the user is entering the curve with the pressure sensitive pad.

FIG. 2 illustrates the screen image of the feedback provided to the user while drawing with the tablet or mouse using the calligraphic tool. In this example, the initial angle and the ending angle of 45 degrees remain constant as the user moves the curve from right to left. Point 305 represents the location where the angle of the stroke approaches and crosses through the angle of the pen which is 45 degrees, at which point the curve becomes very narrow and approximately zero width. The implications of this will be discussed hereinafter.

Before proceeding further, several definitions of terms to be used in this description are required.

The following explains "crossing the angle of the pen." Referring to FIG. 4, the pen has two angles that are considered when crossing the angle of the pen. These are the angle of the pen, and the angle of the pen plus 180 degrees. This is because the pen is symmetrical, so that drawing with a pen angle of 45 degrees results in the same curve as drawing with a pen angle of 225 degrees. These 2 angles specify the two sides of the pen as shown in 105. If an angle is between the pen angle, and the pen angle +180 degrees, it is on one side of the pen (Side 1). If it is between the angle +180 degrees, and the pen angle, it is on the other side of the pen (Side 2). In the case of a 45 degree pen, Side 1 of the pen would be from 45 degrees to 225 degrees, and Side 2 would be from 225 degrees to 45 degrees. (Note that Side 2 contains the angles from 225 to 360 degrees, and from 0 degrees to 45 degrees). Two angles cross the pen if they are on different sides of the pen. For the 45 degree case in 106, angles 60 and 100 degrees do not cross the pen, as they are both on Side 1 of the pen. Angles 60 and 10 degrees do cross the pen as illustrated in 107, as 60 degrees is on Side 1, and 10 degrees is on the Side 2. A curve crosses the pen angle if the angle at the start of the curve is on one side of the pen, and the angle at the end of the curve is on the other side of the pen.

"The angle of the curve at a point" is defined as the angle between a ray going from the point on the curve to the right (positive X in cartesian coordinates) to a ray from the point tangent to the curve, in the direction of the curve. For example, the angle of the curve in FIG. 4, item 104 point 1001 is 0 degrees. If the curve was going from right to left, the angle would be 180.

"Curve" in this discussion is a Bezier curve specified by two end points that the curve passes through, and two control points that the curve does not pass through. In the figures, the points shown are the end points. The control points are not shown, but their location can be derived from the shape of the curve. A Bezier curve can be a straight line between the end points, so in this discussion the term curve includes lines.

Figure 6:
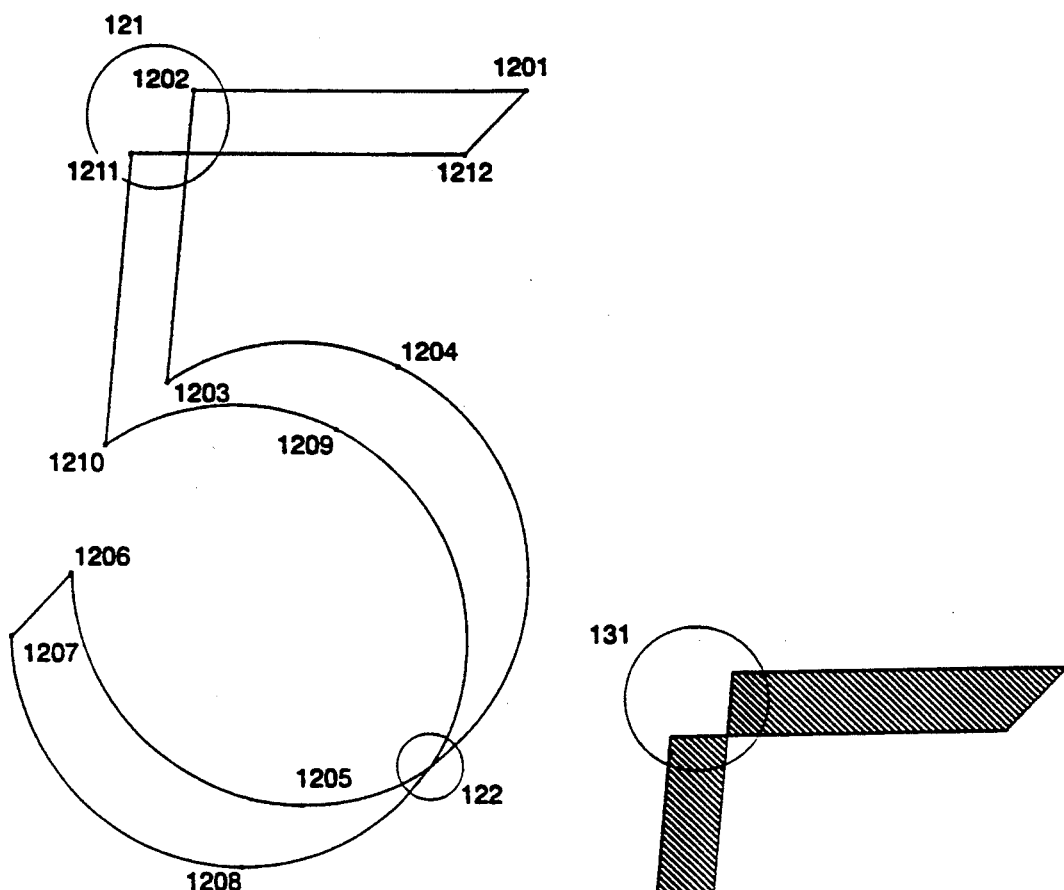
FIG. 6 is the straightforward calligraphic expansion of FIG. 5.

A calligraphic stroke has 2 "sides" and 2 "ends." The ends are lines that are the width and angle of the pen. The sides consist of one or more curves. In FIG. 6, one end is points 1201 and 1212, the other end is 1206 and 1207. The first side consists of the curves between points 1201, 1202, 1203, 1204, 1205 and 1206. The second side consists of 1207, 1208, 1209, 1210, 1211, and 1212.

Figure 3:
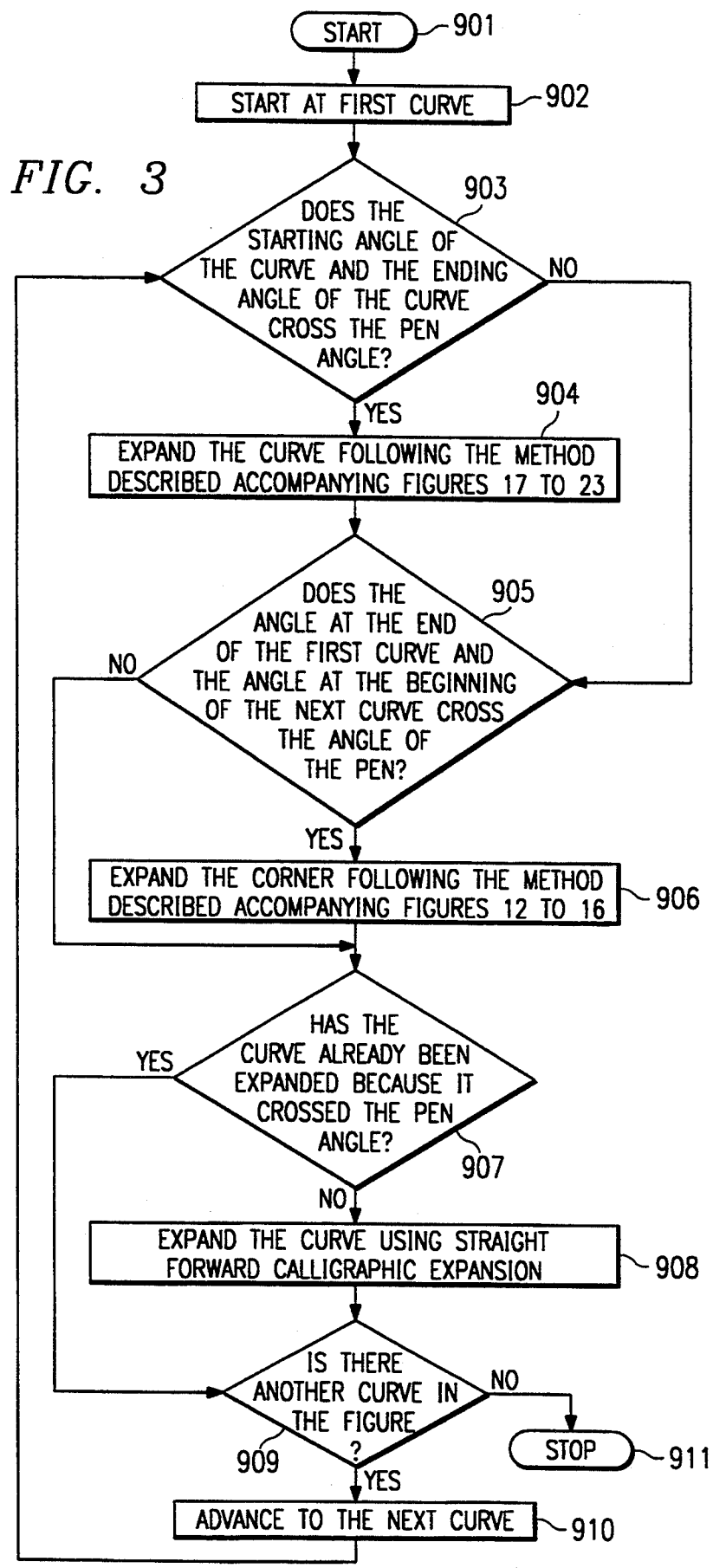
FIG. 3 is a flowchart for improved calligraphic expansion.
Figure 4B:
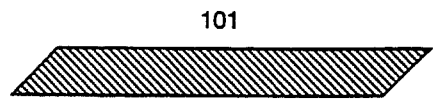
FIG. 4 shows four examples of calligraphic strokes and three examples of angle computation.
Figure 4A:
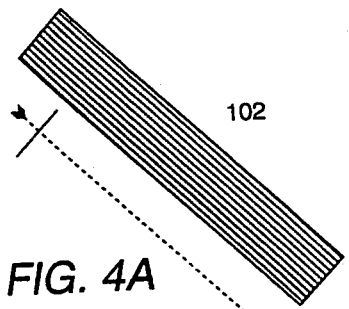
Figure 4C:
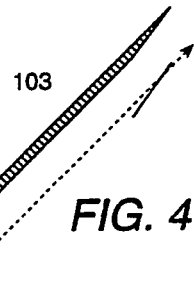
Figure 4D:
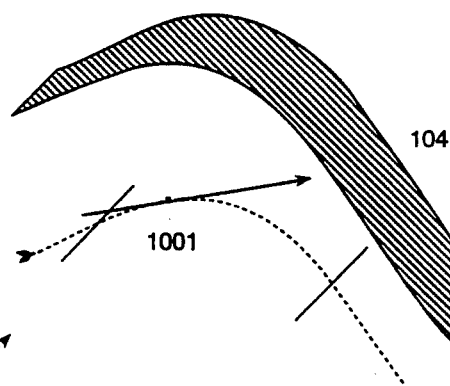
Figure 4E:
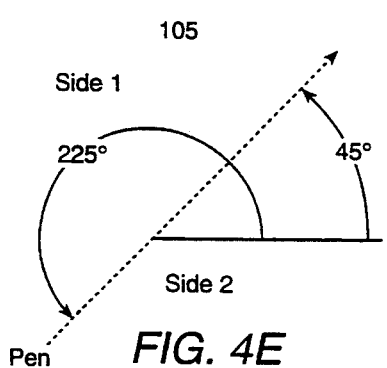
Figure 4F:
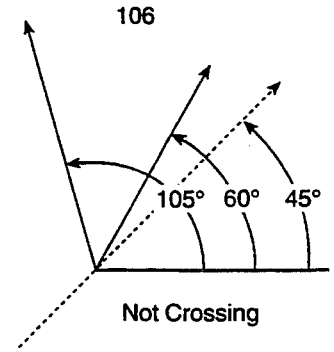
Figure 4G:
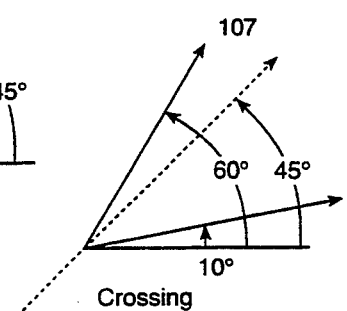

Referring now to FIG. 3, there is shown a flowchart for a method for improved calligraphic expansion. Beginning at 901 the process moves to 902 to begin at the first curve within a calligraphic image. Thereafter, at 903, the system asks whether the starting angle of the curve and the ending angle of the curve cross the pen angle. If no, the system proceeds to 905. However, if the starting angle of the curve and the ending angle of the curve cross the pen angle, then at 904 it expands the curve following the method described within accompanying FIGS. 17 to 23. Thereafter, at 905 the system asks whether the angle at the end of the first curve and the angle at the beginning of the next curve cross the angle of the pen. If no, the system proceeds to 907. However, if the angle at the end of first curve and the angle at the beginning of the next curve do cross the angle of the pen, the system proceeds to 906 to expand the corner following the method described in accompanying FIGS. 12 to 16. Next at 907, the system asks whether the curve has already been expanded because it crossed the pen angle. If yes, the system proceeds to 909; however, if the curve has not already been expanded the system proceeds to 908 where it does expand the curve using straightforward calligraphic expansion. Thereafter, at 909 the system asks whether another curve is in the calligraphic image. If not, the procedure ends at 911. However, if there is another curve in the image, the system proceeds to the next curve at 910 and returns to 903 to begin the process again for the new curve.

Referring again to FIG. 4 there is shown four examples of calligraphic strokes, demonstrating how the width of the stroke and the shape of the ends of the strokes change depending on the angle of the stroke. The strokes are shown as black figures. The pen for these strokes is at a 45 degree angle and is represented as a dotted line. The stroke is shown as a dashed line with arrowheads indicating the direction of the stroke. Item 101 shows a line stroked at 0 degrees, left to right. Note that the ends of the stroke are both 45 degree lines, producing an angled end of the stroke. Item 102 shows a line stroked at 315 degrees. This line is moving perpendicular to the pen, and it is the widest stroke. The ends of the line are both at 45 degrees, producing square ends on the stroke. Item 103 is stroked at a 35 degree angle, from lower left to upper right. The angle of the stroke is close to the angle of the pen, which causes a narrow stroke with long sharp ends to be generated. Item 104 shows a stroke along a curve. The angle of the curve changes along the curve, and the calligraphic stroke widens and narrows as the angle of the curve changes. The angle of the curve at the start of the curve determines the shape of the start of the curve, and the angle of the curve at the end determines the shape of the end.

Figure 5:
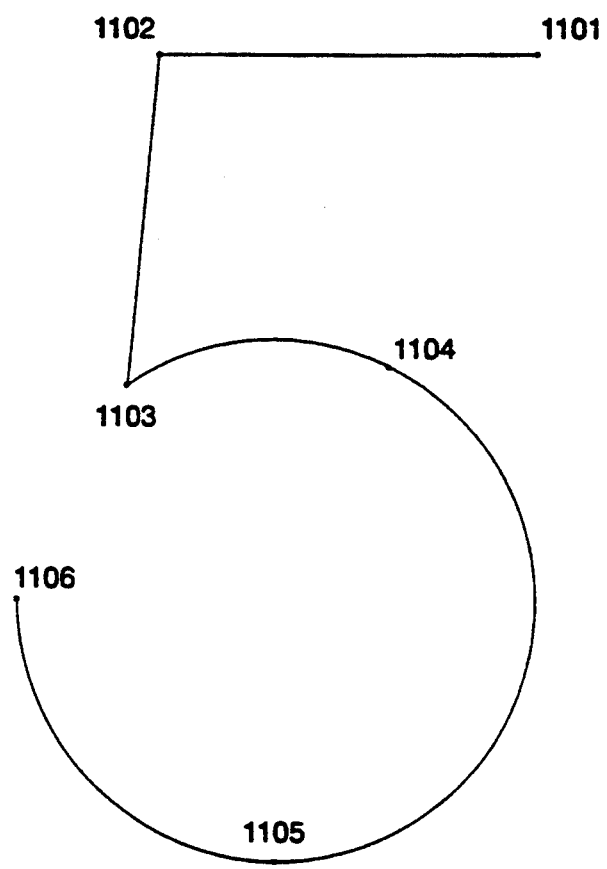
FIG. 5 shows the center line curve which is used to generate a calligraphic stroke.

Referring next to FIG. 5 there is shown a center line curve that will be used to generate a calligraphic stroke. It has two straight strokes, [1101, 1102] and [1102, 1103], three curved strokes [1103, 1104], [1104, 1105], [1105, 1106], and has corners at 1102 and 1103.

Straightforward calligraphic expansion is the process of creating a calligraphic stroke from a center line stroke consisting of one or more curves. The first side of a calligraphic stroke is created by offsetting the center stroke by one half of the pen width in the direction of the pen angle, then creating the second half by offsetting the center stroke by one half of the stroke width in the opposite direction of the pen angle. The first end is created by joining the first points of the sides, and the second end is created by joining the end points of the sides.

FIG. 6 illustrates the straightforward calligraphic expansion of FIG. 5 using a pen angle of 45 degrees. This produces a series of strokes that change as the angle of the strokes change, and the ends of the stroke are both 45 degree lines. However, there are two locations where there are differences between this image and the desired calligraphic stroke. First, the corner at 121 is open. This would not occur if the curve was stroked with a physical pen, and is not a desirable effect. Curves [1202, 1203] and [1211, 1212] cross making it difficult to correct the open corner. Second, curves [1204, 1205] and [1208, 1209] also cross. This produces a stroke that is too narrow where the curves cross, and is difficult to edit as curve [1208, 1209] is in the outside of the image near point 1208, and on the inside of the image near point [1209]. For editing purposes it would be best if the stroke curved from point 1205 to point 1209 so that section could be modified without affecting the rest of the curve.

Figure 7:
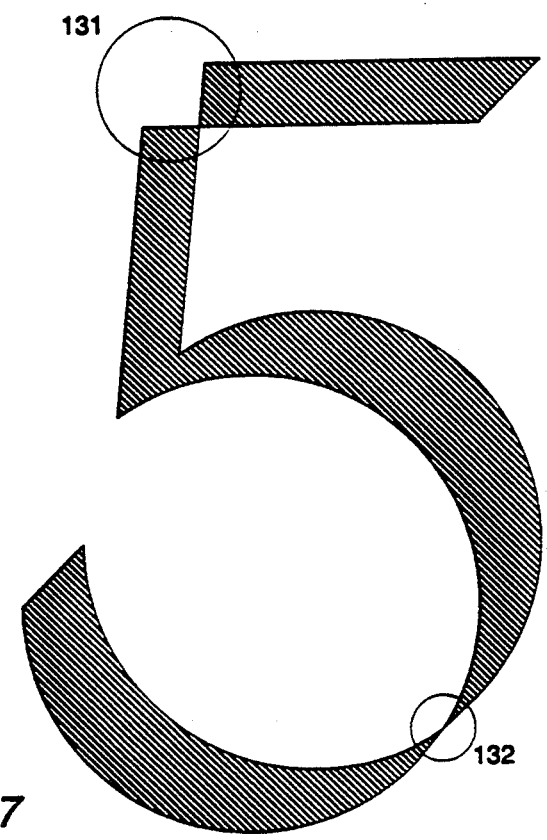
FIG. 7 shows FIG. 6 as a filled figure.

FIG. 7 shows FIG. 6 as a filled figure. This is one example of how the calligraphic outline might be used as a black character. Note the open corner at 131 and the very narrow point at 132.

Figure 8:
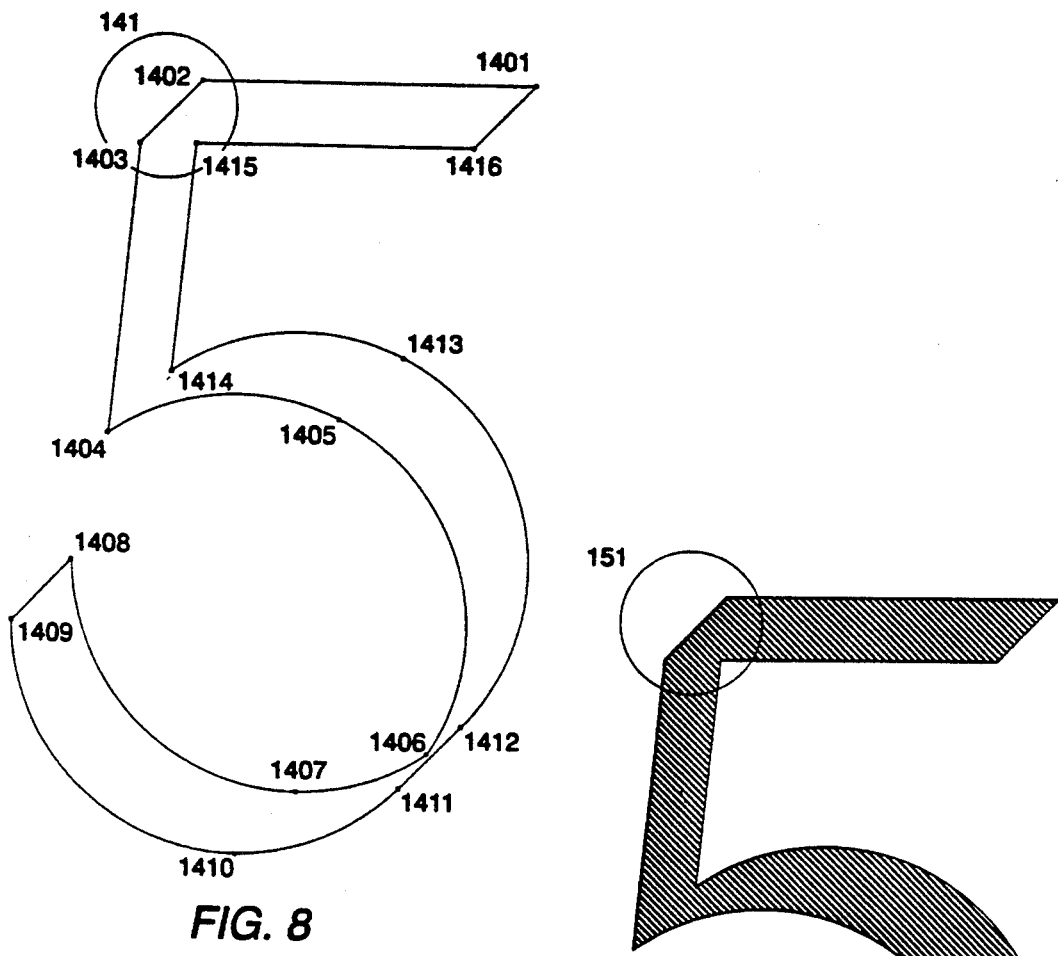
FIG. 8 is the improved calligraphic expansion of FIG. 5 using a pen angle of 45 degrees.

In FIG. 8 there is illustrated the improved calligraphic expansion of FIG. 5 generated by the subject of this patent using a pen angle of 45 degrees. This produces a series of strokes that change as the angle of the strokes change, and the ends of the stroke are both 45 degree lines. The problems exhibited in FIG. 7 have been corrected. The corner at 141 has been filled in with a line that is 45 degrees. This is the same effect a physical pen would produce. The curve proceeds from 1405 to 1406 to 1407, so that the inside of the curve can be modified by moving point 1406, without affecting the outside of the curve at points 1410, 1411, 1412 and 1413.

Figure 9:
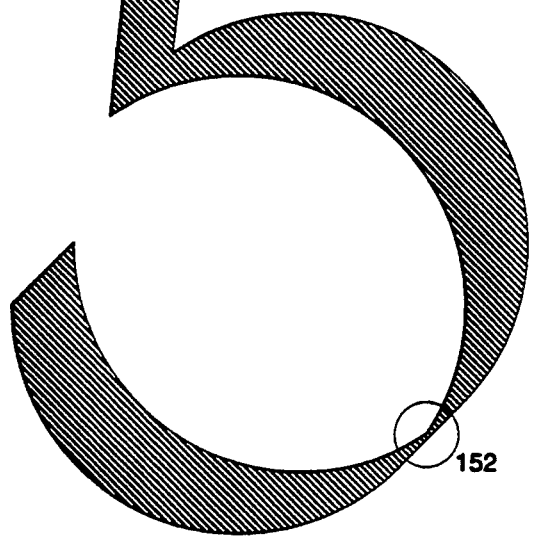
FIG. 9 shows FIG. 8 as a filled figure.

FIG. 9 shows FIG. 8 as a filled figure. Note the filled corner at 151, and that the figure is wider at 152 than FIG. 7 is at 132.

Figure 10:
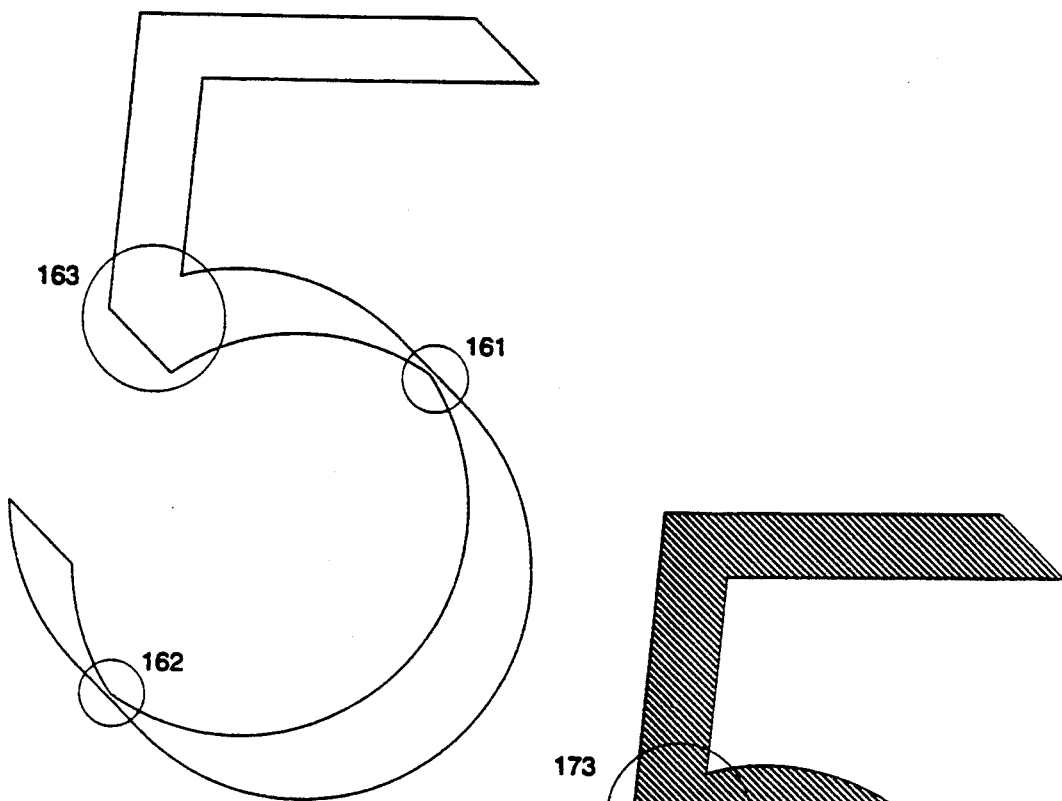
FIG. 10 shows the improved calligraphic expansion of FIG. 5 using a pen angle of 120 degrees.

FIG. 10 shows the improved calligraphic expansion of FIG. 5 generated by the subject of this patent using a pen angle of 120 degrees. This demonstrates that the invention will handle angles other than 45 degrees. Note that there are two narrow spots at 161 and 162, and that the corner at 163 is filled.

Figure 11:
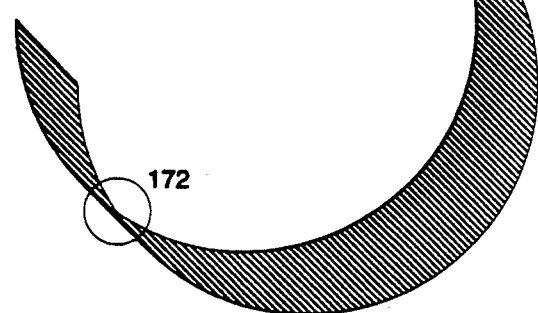
FIG. 11 shows FIG. 10 as a filled figure.

FIG. 11 shows FIG. 10 as a filled figure. Note the width at 171 and 172, and that corner 173 is filled at an angle of 120 degrees.

Figure 12:
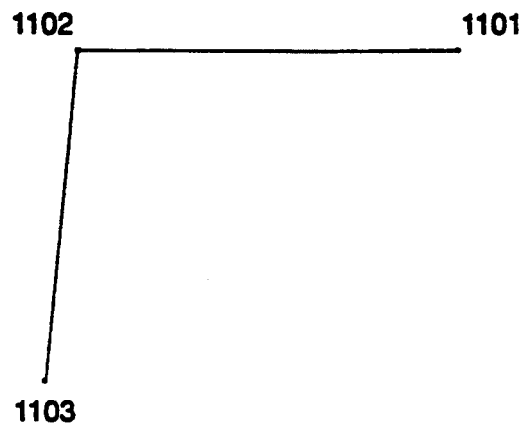
FIG. 12 is a close-up of a corner in FIG. 5.

Referring now to FIG. 12 there is shown a close-up of the corner at 1102 in FIG. 5 that causes a problem in the straightforward calligraphic expansion. The next four figures illustrate how this is handled in the improved method.

Figure 13:
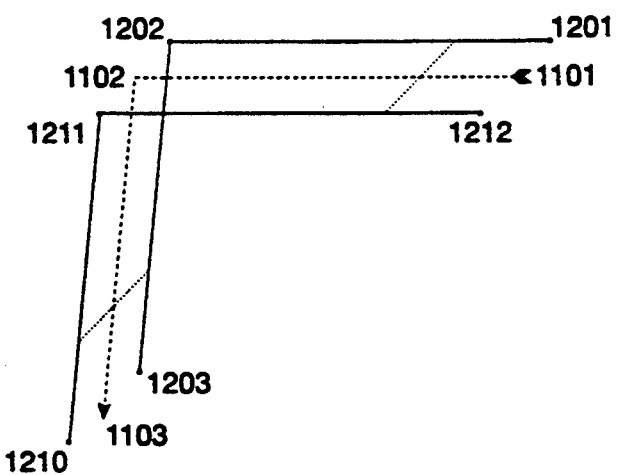
FIG. 13 shows the straightforward expansion of the corner of FIG. 12.

FIG. 13 shows the straightforward expansion of the corner of FIG. 12. The stroke from 1101 to 1103 is shown with a dashed line, and the pen is shown in two spots with a dotted line. The improved method notes that the angle at the beginning of the curve [1101, 1102] of 185 degrees and the angle at the end of the curve [1102, 1103] of 264 degrees cross the pen angle of 45 degrees, 185 is between 45 and 225, and 264 is between 225 and 45 degrees, and does the processing described in FIG. 14 to correct the problem.

The straightforward expansion uses the following algorithm to produce the two sides in FIG. 13 from the input 1101, 1102, 1103:

Side 1 (1201, 1202, 1203) is produced by taking the input points and moving half of the pen width in the direction of the pen angle.

Point 1101 produces point 1201, 1102 produces 1202 and 1103 produces 1203.

Side 2 (1212, 1211, 1210) is produced by taking the input points and half of the pen width in the opposite direction of the pen angle (pen angle + 180 degrees). Point 1101 produces point 1212, point 1102 produces point 1211, and point 1103 produces point 1210.

The final figures are produced by going forward along Side 1 then joining to the end of Side 2 and proceeding backwards along Side 2. This is why the numbering of the points on Side 2 is in reverse order. They are the points on the final figure.

Figure 14:
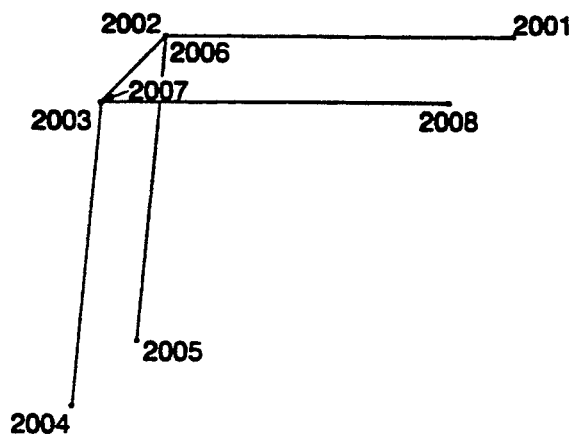
FIG. 14 shows the result of crossing over between the sides of the corner of FIG. 12.

Referring now to FIG. 14, there is shown the result of crossing over between the sides at the corner. In FIG. 13, Side 1 went from 1201 to 1202 to 1203, crossing over Side 2. In FIG. 14, the first curve goes from 2001 to 2002 to 2003 to 2004. The complex expansion algorithm of the present invention modifies the previous straightforward expansion algorithm. Referring to both FIGS. 13 and 14, point 1102 is identified as a point where the incoming and outgoing angles cross the angle of the pen. The first side in FIG. 14 is produced by starting out moving half of the pen width in the direction of the pen angle. Input point 1101 produces point 2001. Input point 1102 produces point 2002. Now, since point 1102 has been identified as a crossing point, input point 102 also produces point 2003 by moving from point 1102 half of the pen width in the opposite direction of the pen angle. Point 1103 is now processed, and it produces point 2004, moving in the opposite direction as the pen angle. The first side is therefore points 2001, 2002, 2003 and 2004. The curve between points 2002 and 2003 does not exist in the original figure. In the examples it is generated as a straight line, to simulate a pen with a straight nib. The second side is produced by starting out moving half of the pen width in the opposite direction of the pen angle. Point 1101 produces point 2008, and point 1102 produces point 2007. Since point 1102 is a crossing point, it also produces point 2006 by moving now in the same direction as the pen angle. Finally, point 1103 produces point 2005 by moving in the same direction as the pen angle. The second side is therefore 2008, 2007, 2006, 2005. As in the first side, the curve between points 2007 and 2006 is generated as a straight line.

Figure 15:
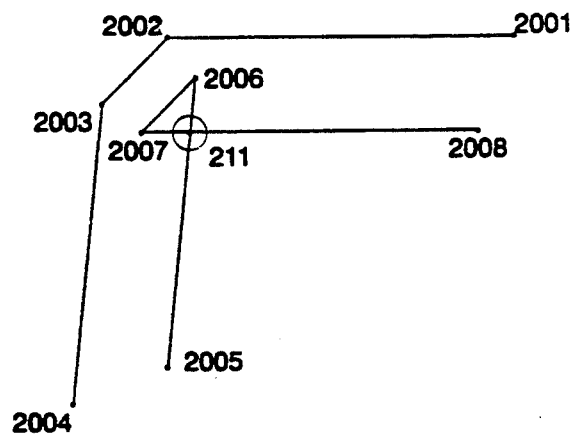
FIG. 15 shows FIG. 14 with the top and bottom curves pulled apart.

FIG. 15 shows FIG. 14 with the first and second curves pulled apart, so the path of the first side and the second side are obvious. The first side and the second side each consist of three curves. The same algorithm is applied to each side. The first and third curves are examined to determine whether and where they intersect. This is done using a well known prior art algorithm involving subdividing the curves in half and recursively examining the halves until it is determined that they do intersect within a specified degree of accuracy. For the first side, curves [2001, 2002] and [2003, 2004] are examined. These curves do not intersect, so no additional processing is required. For the second side, curves [2008, 2007] and [2006, 2005] are examined. These curves intersect at point 211. The following processing is done to curves that intersect:

The original side consisted of 4 points and 3 curves: 2008, 2007, 2006, 2005. If the first and last curves intersect [2008, 2007] and [2006, 2005] in this case, the middle curve [2007, 2006] is discarded, and the first and last curves are ended at the intersection point, in this case 211. The first curve [2008, 2007] is modified to become [2008, 211], and the third curve is modified to become [211, 2005]. The resulting side now goes from the first point, 2008, to the intersection point, 211, to the fourth point, 2005.

Figure 16:
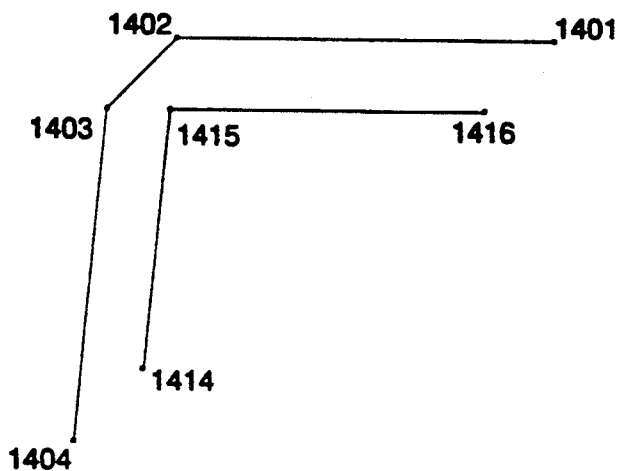
FIG. 16 is the final corner in the calligraphic stroke.

The result of this processing is the two curves as illustrated in FIG. 16.

FIG. 16 is the final corner in the calligraphic stroke. It corresponds to the corner at point 141 in FIG. 8.

Figure 17:
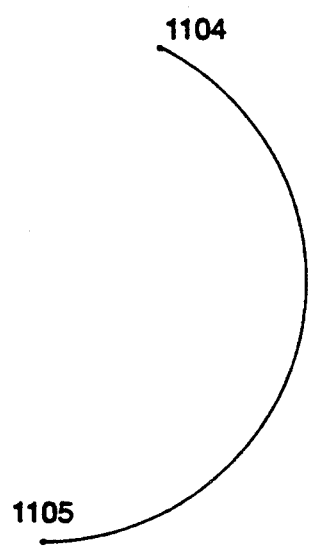
FIG. 17 is a close-up of the curve in FIG. 5.

Referring now to FIG. 17 there is shown a close-up of the curve from point 1104 to point 1105 in FIG. 5 that causes a problem in the previous straightforward calligraphic expansion. The next six figures show how this is handled in the improved method of the present invention.

Figure 18:
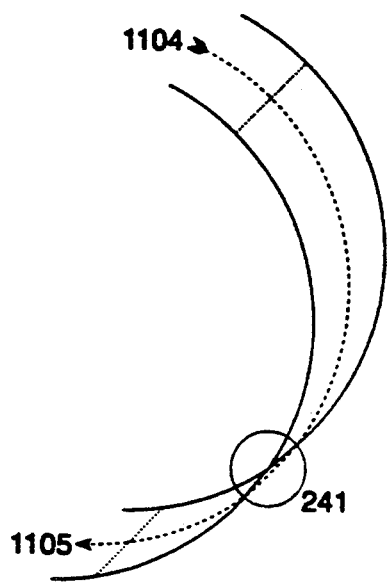
FIG. 18 shows the expansion of the curve of FIG. 17.

FIG. 18 illustrates the straightforward expansion of the curve. The stroke from 1104 to 1105 is shown with a dashed line, and the pen is shown in two spots with a dotted line. The edges cross at 241, causing zero width and editing problems. The improved method of the present invention notes that the angle at the beginning of the curve (point 1104) is 344 degrees and the angle at the end of the curve (point 1105) is 180 degrees. The angles 344 degrees and 180 degrees cross the pen angle of 45 degrees. 180 is between 45 and 225, and 344 is between 225 and 45 degrees. A point is inserted in the curve between 1104 and 1105 at the point in the curve that the curve crosses the angle of the pen, resulting in FIG. 19.

Figure 19:
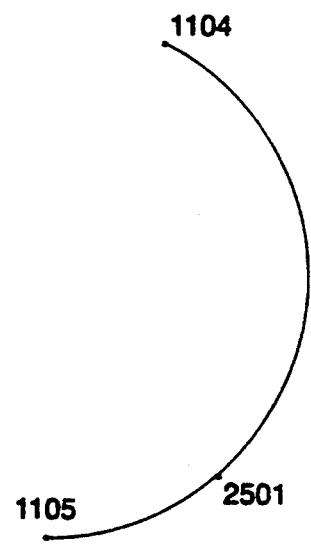
FIG. 19 shows the location of the point where the curve crosses from greater than 225 degrees to less than 225 degrees.

FIG. 19 illustrates the location of point 2501 inserted between 1104 and 1105. 2501 is located at the point the curve crossed from greater than 225 degrees to less than 225 degrees.

Figure 20:
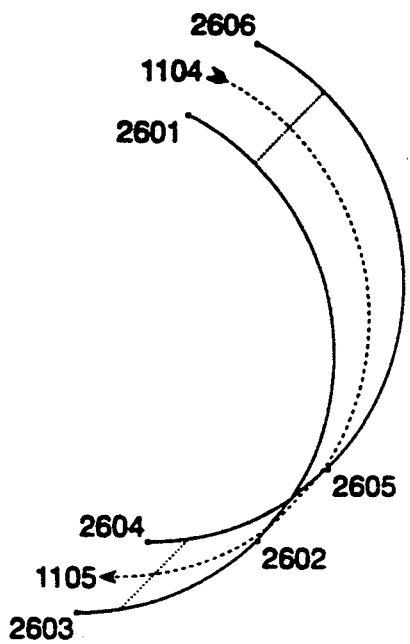
FIG. 20 shows the straightforward expansion of the curve from FIG. 19.

FIG. 20 shows the straightforward expansion of the curve from FIG. 19. The stroke from 1104 to 1105 is shown with a dashed line, and the pen is shown in two spots with a dotted line. The point inserted in FIG. 19 resulted in two additional points in the edges, 2602 and 2605. Since the curve crossed the angle of the pen at these points, it is necessary to cross between the edges at these points.

Figure 21:
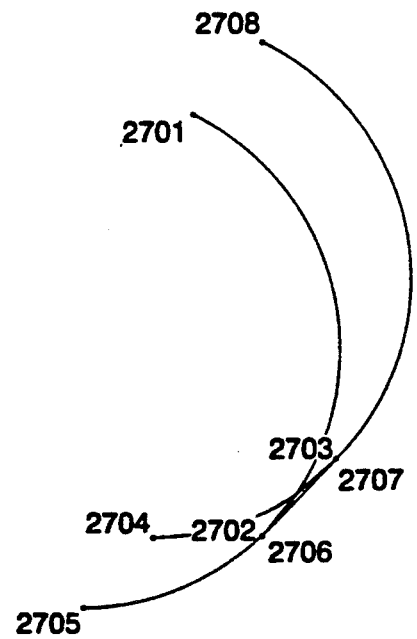
FIG. 21 shows the result of crossing over in FIG. 20.

FIG. 21 shows the result of crossing over at 2602 and 2605. At the additional points, the edges cross over from one side to the other. In FIG. 20, the first side went from 2601 to 2602 to 2603, crossing over the other side. In FIG. 21, the first edge goes from 2701 to 2702 to 2703 to 2704. The bottom side is now 2705, 2706, 2707, 2708. The complex expansion algorithm utilized is the same as in FIG. 14.

Figure 22:
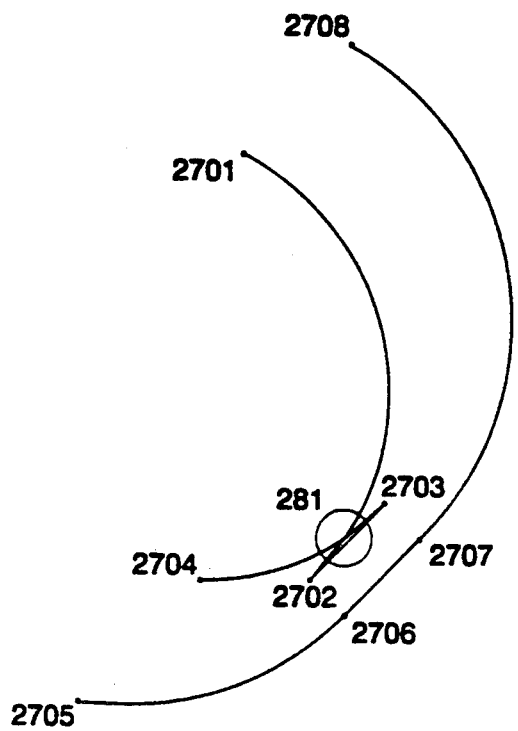
FIG. 22 shows FIG. 21 with the left and right sides pulled apart.

FIG. 22 shows FIG. 21 with the left and right sides pulled apart, so the path of the top side and the bottom side are obvious. Note that the left side crosses itself at 281. Both sides are checked for crossing using the process described in FIG. 15. Curves [2705, 2706] and [2707, 2708] don't cross, so no additional work is needed for the right side. Curves [2701, 2702] and [2703, 2704] cross, so the left side requires more work. The intersection point at 281 is calculated, and the left side is modified to go from 2701 to the new point at 281 to 2704, resulting in FIG. 23.

Figure 23:
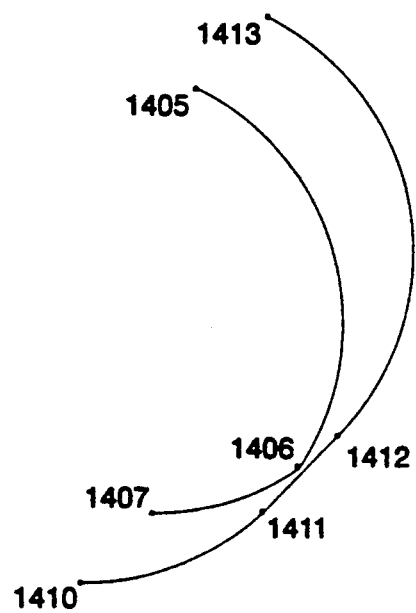
FIG. 23 is the final curve from FIG. 22.

FIG. 23 is the final curve in the calligraphic stroke. It corresponds to the curve at point 1406 in FIG. 8.

Although the present invention and its advantages have been described in detail, it should be understood that various changes, substitutions and alterations can be made herein without departing from the spirit and scope of the invention as defined by the appended claims.

What is claimed is:

1. A method of creating a calligraphic image of a line, said method comprising the steps of:
   accepting data representative of the width of the line to be created, and an input pen angle for said calligraphic image of a line;
   accepting data representative of a direction of the line to be created;
   constructing said calligraphic image of said line concurrently as said line direction is accepted, said constructed line moving at a constant constructed pen angle in accordance with said accepted input pen angle data; and
   generating a spine of said direction data, said spine being the longitudinal center line of said constructed calligraphic image, said spine containing points there along, each said point having data associated therewith pertaining to said width and said pen angle for said calligraphic line image,
   wherein said spine angle data is expressed in Cartesian coordinates representative of said angle at said point, said coordinates used in conjunction with said width data at said point to generate one point along a top peripheral outline of said direction and one point along the bottom peripheral outline of said direction, said peripheral points movable to modify said calligraphic image.

2. The method of creating a calligraphic image in claim 1 further including the step of:
   substituting an outline for said constructed calligraphic image immediately upon the cessation of said accepted line direction data.

3. The method of creating a calligraphic image in claim 1 wherein said constructing step includes:
   maintaining the pen angle at the start point of the image line and the pen angle at the end point of the image line equal to said accepting pen angle data.

4. The method of claim 1 further including the steps of:
   modifying said constructed calligraphic image of said line by changing said angle information while said direction data is being received.

5. The method of claim 1 further including the steps of:

modifying said constructed calligraphic image of said line by changing said width information while said direction data is being received.

6. The method set forth in claim 1 wherein said direction information accepting step includes the step of receiving data from a stylus moving with respect to a surface.

7. The method set forth in claim 6 wherein said end of said stylus is a calligraphic pen tip and wherein said angle is controlled by the angle of said pen tip at any point along said pen tip's trajectory.

8. The method set forth in claim 6 wherein said width data is provided by the pressure of said stylus against said surface.

9. The method of creating a calligraphic image in claim 1 further including the steps of:
implementing a first expansion of said spine segment into said calligraphic image if the starting angle of direction of said segment and the ending angle of direction of said segment cross the pen angle for said calligraphic line.

10. The method of creating a calligraphic image in claim 9 further including the step of:
implementing a second expansion at the intersection of said segment and a next segment if the angle of direction at the end of said segment and the angle of direction at the beginning of said next segment cross the pen angle of said calligraphic line.

11. The method of creating a calligraphic image in claim 10 further including the step of:
expanding said line segment using calligraphic expansion if said first and second expansions have not occurred.

12. The method of creating a calligraphic image in claim 9 wherein said first expansion step further includes:
prohibiting a crossover of the outlines of said image.

13. The method of creating a calligraphic image in claim 10 wherein said second expansion step further includes:
generating points along a top peripheral outline of said segment and points along the bottom peripheral outline of said segment;
generating points along a top peripheral outline of said next segment and points along the bottom peripheral outline of said next segment; and
connecting the end points of said peripheral outlines of said segment to the beginning points of said peripheral outlines of said next segment wherein a crossover of said peripheral outlines is prohibited.

14. The method of creating a calligraphic image in claim 13 wherein said connecting step connects said end point of said top peripheral outline of said segment to said beginning point of said bottom peripheral outline of said next segment and connects said end point of said bottom peripheral outline of said segment to said beginning point of said top peripheral outline of said next segment.

15. A method of creating a calligraphic image of a line, said method comprising the steps of:
accepting data representative of the initial width of the line to be created, and an initial pen angle for said calligraphic line;
accepting data representative of a direction of the line to be created;
accepting data representative of any variations in said width data and said pen angle data of said line concurrently with the reception of said direction data; and
constructing said calligraphic image of said line concurrently as said line direction is accepted, incorporating said initial data and said variations in said width and said pen angle of said line.

16. The method of creating a calligraphic image in claim 15 further including the step of:
substituting an outline for said constructed calligraphic image immediately upon the cessation of said accepted line direction data.

17. A system for creating a calligraphic image of a line, said system comprising:
means for accepting data representative of the width of the line to be created, and an input pen angle for said calligraphic line;
means for accepting data representative of a direction of the line to be created;
means for constructing said calligraphic image of said line concurrently as said line direction is accepted, said constructed image line moving at a constant constructed pen angle in accordance with said accepted input pen angle data; and
means for generating a spine of said direction data, said spine being the longitudinal center line of said constructed calligraphic image, said spine containing points there along, each said point having data associated therewith pertaining to said width and said pen angle for said calligraphic line image,
wherein said spine angle data is expressed in Cartesian coordinates representative of said angle at said point, said coordinates used in conjunction with said width data at said point to generate one point along a top peripheral outline of said direction and one point along the bottom peripheral outline of said direction, said peripheral points movable to modify said calligraphic image.

18. The system for creating a calligraphic image in claim 17 further including:
means for substituting an outline for said constructed calligraphic image immediately upon the cessation of said accepted line direction data.

19. The system for creating a calligraphic image in claim 17 wherein said means for constructing includes:
means for maintaining the pen angle at the start point of the image line and the pen angle at the end point of the image line equal to said accepting pen angle data.

20. The system of claim 17 further including:
means for modifying said constructed calligraphic image of said line by changing said pen angle information while said direction data is being received.

21. The system of claim 17 further including:
means for modifying said constructed calligraphic image of said line by changing said width information while said direction data is being received.

22. The system set forth in claim 17 wherein said means for accepting direction information includes means for receiving data from a stylus moving with respect to a surface.

23. The system set forth in claim 22 wherein said end of said stylus is a calligraphic pen tip and wherein said angle is controlled by the angle of said pen tip at any point along said pen tip's trajectory.

24. The system set forth in claim 22 wherein said width data is provided by the pressure of said stylus against said surface.

25. The system for creating a calligraphic image set forth in claim 17 further including:
means for choosing a segment of said spine for expansion into a calligraphic image; and
means for implementing a first expansion of said spine segment into said calligraphic image if the starting angle of direction of said segment and the ending angle of direction of said segment cross the pen angle for said calligraphic line.

26. The system for creating a calligraphic image set forth in claim 25 further including:
means for implementing a second expansion at the intersection of said segment and a next segment if the angle of direction at the end of said segment and the angle of direction at the beginning of said next segment cross the pen angle of said calligraphic line.

27. The system for creating a calligraphic image set forth in claim 26 further including:
means for expanding said line segment using straightforward calligraphic expansion if said first and second expansions have not occurred.

28. The system for creating a calligraphic image set forth in claim 25 wherein said first expansion further includes:
means for generating points along a top peripheral outline and points along the bottom peripheral outline of said segment, wherein a crossover of said top outline and said bottom outline is prohibited.

29. The system for creating a calligraphic image set forth in claim 26 wherein said second expansion further includes:
means for generating points along a top peripheral outline of said segment and points along the bottom peripheral outline of said segment;
means for generating points along a top peripheral outline of said next segment and points along the bottom peripheral outline of said next segment; and
means for connecting the end points of said peripheral outlines of said segment to the beginning points of said peripheral outlines of said next segment wherein a crossover of said peripheral outlines is prohibited.

30. The system for creating a calligraphic image in claim 29 wherein said means for connecting connects said end point of said top peripheral outline of said segment to said beginning point of said bottom peripheral outline of said next segment and connects said end point of said bottom peripheral outline of said segment to said beginning point of said top peripheral outline of said next segment.

31. The system for creating a calligraphic image in claim 25 wherein said first expansion further includes:
means for generating said points along said top peripheral outline until arriving at the crossing point along said spine segment where said starting angle of direction of said segment and the ending angle of direction of said segment cross said pen angle for said calligraphic line;
means for generating said points along said bottom peripheral outline after said crossing point;
means for connecting with a straight line the last point along said top peripheral outline before said crossing point and the beginning point along said bottom peripheral outline after said crossing point,
wherein a first side of said expanded spine segment includes said top peripheral outline before said crossing point and said bottom peripheral outline after said crossing point and said straight-line connection;
means for generating said points along said bottom peripheral outline before said crossing point;
means for generating said points along said top peripheral outline after said crossing point;
means for connecting with a straight line the last point along said bottom peripheral outline before said crossing point and said top peripheral outline after said crossing point,
wherein a second side of said expanded spine segment includes said bottom peripheral outline before said crossing point and said top peripheral outline after said crossing point and said straight line connection;
means for examining separately said first and second sides for points of intersection;
means for leaving either of said first or second sides intact if no points of intersection are found;
means for discarding said straight-line connection in said side if either side intersects said either side; and
means for discarding said points along said outlines from said ends of said straight-line connection to said intersection point.

32. A system for creating a calligraphic image of a line, said system comprising:
means for accepting data representative of the initial width of the line to be created, and an initial pen angle for said calligraphic line;
means for accepting data representative of a direction of the line to be created;
means for accepting data representative of any variations in said width data and said pen angle data of said line concurrently with the reception of said direction data; and
means for constructing said calligraphic image of said line concurrently as said line direction is accepted, incorporating said initial data and said variations in said width and said pen angle of said line.

33. The system for creating a calligraphic image in claim 32 further including:
means for substituting an outline for said constructed calligraphic image immediately upon the cessation of said accepted line direction data.

34. A system for generating a font image having calligraphic characteristics, said system comprising:
means for accepting data representative of the width for each curve in said font image, and an input pen angle for each said curve;
means for accepting data representative of a direction of each desired curve in said font image;
means for constructing each said curve of said font image concurrently as said curve direction is accepted, said constructed font curve moving at a constant constructed pen angle in accordance with said accepted input pen angle data; and
means for generating a spine of said direction data, said spine being the longitudinal center line of said constructed calligraphic font image, said spine containing points there along, each said point having data associated therewith pertaining to said width and said pen angle for said calligraphic font image,
wherein said spine angle data is expressed in Cartesian coordinates representative of said angle at said point, said coordinates used in conjunction with said width data at said point to generate one point along a top peripheral outline of said direction and one point along the bottom peripheral outline of said direction, said peripheral points movable to modify said calligraphic font image.

35. The system for generating a font as set forth in claim 34 wherein said accepting means is an object moving across a surface to define said desired position and direction characteristics.

36. The system for generating a font as set forth in claim 35 wherein said object is a stylus having a point of contact with said surface.

37. The system in claim 35 wherein said object is a mouse.

38. The system for generating a font as set forth in claim 34 wherein said accepting means and said generating means are included within a computer system wherein said font is generated within said computer system for display by an output means.

39. The system for generating a font as set forth in claim 38 wherein said output means is a video terminal.

40. The system for generating a font as set forth in claim 38 wherein said output means is a printer.

41. The method of creating a calligraphic image in claim 9 wherein said first expansion step further includes:

generating said points along said top peripheral outline until arriving at the crossing point along said spine segment where said starting angle of direction of said segment and the ending angle of direction of said segment cross said pen angle for said calligraphic line;

generating said points along said bottom peripheral outline after said crossing point;

connecting with a straight line the last point along said top peripheral outline before said crossing point and the beginning point along said bottom peripheral outline after said crossing point, wherein a first side of said expanded spine segment includes said top peripheral outline before said crossing point and said bottom peripheral outline after said crossing point and said straight-line connection;

generating said points along said bottom peripheral outline before said crossing point;

generating said points along said top peripheral outline after said crossing point;

connecting with a straight line the last point along said bottom peripheral outline before said crossing point and said top peripheral outline after said crossing point, wherein a second side of said expanded spine segment includes said bottom peripheral outline before said crossing point and said top peripheral outline after said crossing point and said straight line connection;

examining separately said first and second sides for points of intersection;

leaving either of said first or second sides intact if no points of intersection are found;

discarding said straight-line connection in said side if either side intersects said either side; and discarding said points along said outlines from said ends of said straight-line connection to said intersection point.

42. A method of creating a calligraphic image of a line, said method comprising the steps of:

accepting data representative of the width of the line to be created, and an input pen angle for said calligraphic line;

accepting data representative of a direction of the line to be created;

constructing said calligraphic image of said line concurrently as said line direction is accepted, said constructed image line moving at a constant constructed pen angle in accordance with said accepted input pen angle data;

generating a spine of said direction data, said spine being the longitudinal center line of said constructed calligraphic image, said spine containing points there along, each said point having data associated therewith pertaining to said width and said pen angle for said calligraphic line image;

choosing a segment of said spine for expansion into a calligraphic image; and implementing a first expansion of said spine segment into said calligraphic image if a crossing point occurs in said spine segment wherein the starting angle of direction of said segment and the ending angle of direction of said segment cross the pen angle for said calligraphic line.

43. The method of creating a calligraphic image in claim 42 wherein said first expansion step further includes the steps of:

generating points along a first side of said spine segment utilizing a normal calligraphic expansion wherein said points are generated by moving out from said spine segment one-half of said width in the direction of said pen angle and continuing to generate points along said spine segment until arriving at said crossing point along said spine segment;

generating a first point along said first side at said crossing point utilizing said normal calligraphic expansion;

generating a second point along said first side at said crossing point by moving out from said spine segment one-half of said width in the opposite direction of said pen angle;

connecting with a straight line said first point and said second point at said crossing point; and generating points along said first side of said spine segment after said crossing point by moving out from said spine segment one-half of said width in said opposite direction of said pen angle;

generating points along a second side of said spine segment utilizing a normal calligraphic expansion wherein said points are generated by moving out from said spine segment one-half of said width in the opposite direction of said pen angle and continuing to generate points along said spine segment until arriving at said crossing point along said spine segment;

generating a first point along said second side at said crossing point utilizing said normal calligraphic expansion in said opposite direction of said pen angle;

generating a second point along said second side at said crossing point by moving out from said spine segment one-half of said width in said direction of said pen angle;

connecting with a straight line said first point and said second point along said second side at said crossing point;

generating points along said second side of said spine segment after said crossing point by moving out from said spine segment one-half of said width in said direction of said pen angle.

44. The method of creating a calligraphic image in claim 42 further comprising the step of:

implementing a second expansion at the point of intersection of said spine segment and a next spine segment of said calligraphic line if the angle of direction at the end of said spine segment and the angle of direction at the beginning of said next spine segment cross the pen angle of said calligraphic line.

45. The method of creating a calligraphic image in claim 44 wherein said second expansion step further includes the steps of:

generating points along a first side of said spine segment utilizing a normal calligraphic expansion wherein said points are generated by moving out from said spine segment one-half of said width in the direction of said pen angle and continuing to generate points along said spine segment until arriving at said intersection point along said spine segment;

generating a first point along said first side at said intersection point utilizing said normal calligraphic expansion;

generating a second point along said first side at said intersection point by moving out from said spine segment one-half of said width in the opposite direction of said pen angle;

connecting with a straight line said first point and said second point at said intersection point;

generating points along said first side of said spine segment after said intersection point by moving out from said spine segment one-half of said width in said opposite direction of said pen angle;

generating points along a second side of said spine segment utilizing a normal calligraphic expansion wherein said points are generated by moving out from said spine segment one-half of said width in the opposite direction of said pen angle and continuing to generate points along said spine segment until arriving at said intersection point along said spine segment;

generating a first point along said second side at said intersection point utilizing said normal calligraphic expansion in said opposite direction of said pen angle;

generating a second point along said second side at said intersection point by moving out from said spine segment one-half of said width in said direction of said pen angle;

connecting with a straight line said first point and said second point along said second side at said intersection point; and generating points along said second side of said spine segment after said intersection point by moving out from said spine segment one-half of said width in said direction of said pen angle.

46. A system for creating a calligraphic image of a line, said system comprising:

means for accepting data representative of the width of the line to be created, and a pen angle for said calligraphic line;

means for accepting data representative of a direction of the line to be created;

means for constructing said calligraphic image of said line concurrently as said line direction is accepted, said image line moving at a constant pen angle in accordance with said accepted pen angle data;

means for generating a spine of said direction data, said spine being the longitudinal center line of said constructed calligraphic image, said spine containing points there along, each said point having data associated therewith pertaining to said width and said pen angle for said calligraphic line image;

means for choosing a segment of said spine for expansion into a calligraphic image; and means for implementing a first expansion of said spine segment into said calligraphic image if a crossing point occurs in said spine segment wherein the starting angle of direction of said segment and the ending angle of direction of said segment cross the pen angle for said calligraphic line.

47. The system for creating a calligraphic image in claim 46 wherein said first expansion further includes:

means for generating points along a first side of said spine segment utilizing a normal calligraphic expansion wherein said points are generated by moving out from said spine segment one-half of said width in the direction of said pen angle and continuing to generate points along said spine segment until arriving at said crossing point along said spine segment;

means for generating a first point along said first side at said crossing point utilizing said normal calligraphic expansion;

means for generating a second point along said first side at said crossing point by moving out from said spine segment one-half of said width in the opposite direction of said pen angle;

means for connecting with a straight line said first point and said second point at said crossing point;

means for generating points along said first side of said spine segment after said crossing point by moving out from said spine segment one-half of said width in said opposite direction of said pen angle;

means for generating points along a second side of said spine segment utilizing a normal calligraphic expansion wherein said points are generated by moving out from said spine segment one-half of said width in the opposite direction of said pen angle and continuing to generate points along said spine segment until arriving at said crossing point along said spine segment;

means for generating a first point along said second side at said crossing point utilizing said normal calligraphic expansion in said opposite direction of said pen angle;

means for generating a second point along said second side at said crossing point by moving out from said spine segment one-half of said width in said direction of said pen angle;

means for connecting with a straight line said first point and said second point along said second side at said crossing point; and means for generating points along said second side of said spine segment after said crossing point by moving out from said spine segment one-half of said width in said direction of said pen angle.

48. The system for creating a calligraphic image in claim 46 further comprising:

means for implementing a second expansion at the point of intersection of said spine segment and a next spine segment of said calligraphic line if the angle of direction at the end of said spine segment and the angle of direction at the beginning of said next spine segment cross the pen angle of said calligraphic line.

49. The system for creating a calligraphic image in claim 48 wherein said second expansion further includes:

means for generating points along a first side of said spine segment utilizing a normal calligraphic expansion wherein said points are generated by moving out from said spine segment one-half of said width in the direction of said pen angle and continuing to generate points along said spine segment until arriving at said intersection point along said spine segment;

means for generating a first point along said first side at said intersection point utilizing said normal calligraphic expansion;

means for generating a second point along said first side at said intersection point by moving out from said spine segment one-half of said width in the opposite direction of said pen angle;

means for connecting with a straight line said first point and said second point at said intersection point;

means for generating points along said first side of said spine segment after said intersection point by moving out from said spine segment one-half of said width in said opposite direction of said pen angle;

means for generating points along a second side of said spine segment utilizing a normal calligraphic expansion wherein said points are generated by moving out from said spine segment one-half of said width in the opposite direction of said pen angle and continuing to generate points along said spine segment until arriving at said intersection point along said spine segment;

means for generating a first point along said second side at said intersection point utilizing said normal calligraphic expansion in said opposite direction of said pen angle;

means for generating a second point along said second side at said intersection point by moving out from said spine segment one-half of said width in said direction of said pen angle;

means for connecting with a straight line said first point and said second point along said second side at said intersection point; and means for generating points along said second side of said spine segment after said intersection point by moving out from said spine segment one-half of said width in said direction of said pen angle.

* * * * *